United States Patent
Syverson et al.

(10) Patent No.: US 6,848,147 B2
(45) Date of Patent: Feb. 1, 2005

(54) INTERNALLY DRIVEN AGITATOR

(75) Inventors: Charles D. Syverson, North Mankato, MN (US); James Vernon Cunningham, Aurora (CA); I. Michael Gomes, Cambridge (CA); Mark E. Reindle, Parma, OH (US)

(73) Assignee: Royal Appliance Mfg. Co., Glenwillow, OH (US)

( * ) Notice: Subject to any disclaimer, the term of this patent is extended or adjusted under 35 U.S.C. 154(b) by 256 days.

(21) Appl. No.: 10/117,907

(22) Filed: Apr. 8, 2002

(65) Prior Publication Data

US 2003/0188397 A1 Oct. 9, 2003

(51) Int. Cl.[7] ............................. A47L 9/04; A46B 13/02
(52) U.S. Cl. ............................................. 15/389; 15/383
(58) Field of Search .................... 15/383, 389, 392, 15/377

(56) References Cited

U.S. PATENT DOCUMENTS

| 1,914,834 A | 6/1933 | Otto |
| 1,953,340 A | 4/1934 | Doemling |

(List continued on next page.)

FOREIGN PATENT DOCUMENTS

| EP | 0 947 155 | | 6/1999 |
| JP | 54-118659 | * | 9/1979 |
| JP | 01166730 | | 6/1989 |
| JP | 07327884 | | 12/1995 |
| JP | 11042184 | | 2/1999 |
| JP | 11-313786 | * | 11/1999 |
| JP | 2000-354569 | * | 12/2000 |
| JP | 2001-000371 | * | 1/2001 |

OTHER PUBLICATIONS

Switched Reluctance Motor Drives, pp. 1–5, Apr. 4, 2001, http://www.fleadh.co.uk/srm.htm.
Digital Induction Drive Technology, pp. 1–20, Apr. 4, 2001, http://pemclab.cn/nctu.edu.tw/W3dsp/dsp–challenge/tidsp97/tidsp97/htm.
Oxford Science Publications, Monographs in Electrical and Electronic Engineering No. 21, "Brushless Permanent–Magnet and Reluctance Motor Drives", T.J.E. Miller, Cover and pp. 81, 120 and 177.

*Primary Examiner*—Terrence R. Till
(74) *Attorney, Agent, or Firm*—Fay, Sharpe, Fagan, Minnich & McKee, LLP

(57) ABSTRACT

A vacuum cleaner includes a housing adapted for movement on a subjacent surface and a nozzle defined in the housing, the nozzle having an opening. A brushroll tube, having first and second ends and a longitudinal axis, is rotatably mounted to the housing adjacent the nozzle opening. At least one cleaning element protrudes from the brushroll tube. A shaft is located in the brushroll tube and extends along the longitudinal axis thereof. A stator is rigidly mounted on the shaft. A cylinder surrounds the shaft and the stator and is spaced therefrom. The cylinder is rigidly connected to the brushroll tube. A permanent magnet rotor is fixedly mounted to an interior surface of the cylinder. The permanent magnet rotor overlies and is coaxial with the stator and is spaced therefrom. The rotor and stator form a motor for rotating the brushroll tube wherein the rotor is driven by changes in induced magnetic fields in the stator.

19 Claims, 13 Drawing Sheets

U.S. PATENT DOCUMENTS

| | | |
|---|---|---|
| 3,074,089 A | 1/1963 | Brown, Jr. |
| 3,100,907 A | 8/1963 | Schwertl |
| 4,099,291 A | 7/1978 | Bowerman |
| 4,245,370 A | 1/1981 | Baker |
| 4,268,769 A | 5/1981 | Dorner et al. |
| 4,384,386 A | 5/1983 | Dorner et al. |
| 4,479,078 A * | 10/1984 | Kidd et al. .................. 318/254 |
| 4,955,106 A | 9/1990 | Stein et al. |
| 5,030,864 A | 7/1991 | Van Hout et al. |
| 5,548,173 A | 8/1996 | Stephenson |
| 5,918,728 A | 7/1999 | Syverson |
| 5,923,111 A | 7/1999 | Eno et al. |
| 5,940,927 A | 8/1999 | Haegermarck et al. |
| 6,206,181 B1 | 3/2001 | Syverson |
| 6,323,570 B1 | 11/2001 | Nishimura et al. |
| 6,400,048 B1 | 6/2002 | Nishimura et al. |
| 6,757,934 B2 | 7/2004 | Park |
| 2002/0184732 A1 * | 12/2002 | Kim et al. .................... 15/377 |
| 2002/0194697 A1 * | 12/2002 | Park ........................... 15/392 |
| 2003/0037408 A1 | 2/2003 | Park |
| 2004/0000023 A1 * | 1/2004 | Hitzelberger et al. ......... 15/389 |

* cited by examiner

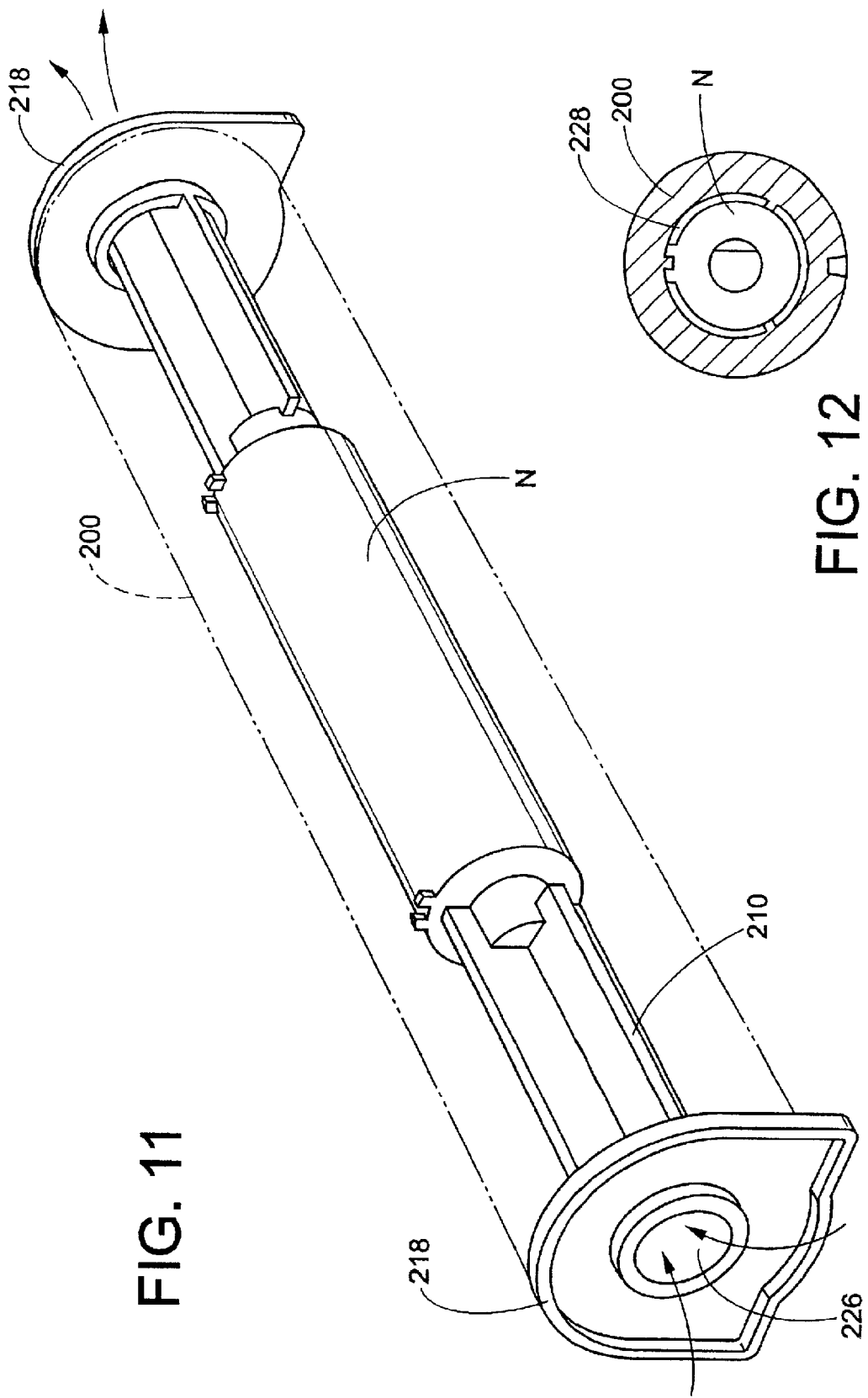

INTERNALLY DRIVEN AGITATOR

BACKGROUND OF THE INVENTION

The present invention relates to the art of electric motors. The invention finds particular application in rotating a brush device in a vacuum cleaning apparatus. It is to be appreciated however, that the present invention may find further application in other environments where it is advantageous to controllably rotate cleaning devices or other parts.

Typically, upright vacuum cleaners use a belt driven brushroll or agitator which rotates and urges dust, dirt, and the like up from the floor or other surface meant to be cleaned. In general, these devices use a relatively high speed motor that drives the brushroll by means of a rubberized flat belt, cogged belt or round cross section belt. In many embodiments, the motor shaft is relatively small in diameter, while the diameter of the brushroll tube is significantly larger. This results in a speed reduction of several fold.

Historically, these belts have had a finite life and begin to slip and finally fail after a certain period of use. Operators must thus keep a supply of replacement belts on hand, and have the mechanical ability to replace these belts. If either the replacement belts or mechanical ability are lacking, there is some cost and inconvenience associated with the failure of these devices.

The present invention contemplates an improved brushroll which overcomes the above-referenced problems and others.

SUMMARY OF THE INVENTION

In accordance with one aspect of the invention, a combination brushroll and motor assembly is provided for cleaning device. More particularly in accordance with this aspect of the invention, the combination comprises a dowel having first and second ends along a longitudinal axis and a housing to which the dowel is rotatably mounted. At least one cleaning element protrudes from the dowel. A first shaft is connected to a first end of the dowel and extends along the longitudinal axis. A housing is secured to the first end of dowel and then circles at least a portion of the first shaft. The housing defines an interior volume. A motor assembly is supported within the interior volume and encircles at least a portion of the first shaft.

In accordance with another aspect of the invention, a vacuum cleaner is provided. More particularly in accordance with this aspect of the invention, the vacuum cleaner comprises a nozzle and a brushroll positioned adjacent to the nozzle, the brushroll comprising first and second ends and longitudinal axis. A stationary shaft is connected to the brushroll at the first end and extends along the longitudinal axis. An interior volume is defined by the brushroll tube and a magnetic assembly is supported within the interior volume by the stationary shaft. The magnetic assembly selectively magnetically interacts with a wall of the interior volume to induce rotation of the brushroll.

In accordance with still another aspect of the invention, a vacuum cleaner is provided. More particularly in accordance with this aspect of the invention, the vacuum cleaner comprises a housing adapted for movement on subjacent surface and a nozzle defined in the housing, the nozzle having an opening. A brushroll is rotatably mounted to the housing adjacent to the nozzle opening. The brushroll comprises a brushroll tube having first and second ends and a longitudinal axis and an interior volume defined in the brushroll tube. A magnet is rotatably mounted in the interior volume. An armature is rigidly mounted in the interior volume and spaced from the magnet.

In accordance with yet another aspect of the invention, a vacuum cleaner is provided. More particularly in accordance with this aspect of the invention, the vacuum cleaner comprises a housing adapted for movement on a subjacent surface, a nozzle defined in the housing with the nozzle having an opening and a brushroll tube having first and second ends and a longitudinal axis. The brushroll tube is rotatably mounted to the housing adjacent the nozzle opening. At least one cleaning element protrudes from the brushroll tube. A shaft is mounted in the brushroll tube and extends along the longitudinal axis thereof. A stator is rigidly mounted on the shaft. A cylinder surrounds the shaft and the stator. The cylinder being rigidly connected to the brushroll tube. A permanent magnet rotor is fixedly mounted to an interior surface of the cylinder. The permanent magnet rotor overlies and is coaxial with the stator. The rotor and stator form a motor for rotating the dowel wherein the rotor is driven by changes in induced magnetic fields in the stator.

In accordance with another aspect of the invention, a method of rotating a surface working apparatus in a vacuum cleaner comprises applying an electrical signal to a motor within the surface working apparatus. Responsive to the applied electrical signal, an electromagnetic field is generated which interacts with a permanent-magnetic field associated with an interior wall of the surface working apparatus, inducing rotation in the surface working apparatus. Rotational information concerning the surface working apparatus is computed, and the applied electrical signal to the motor is altered based on the computed rotational information.

BRIEF DESCRIPTION OF THE DRAWINGS

The invention may take physical form in certain parts and arrangements of parts and in various steps and arrangements of steps. The drawings are only for purposes of illustrating the preferred embodiments and are not to be construed as limiting the invention.

FIG. 11 is a see through perspective view of the internally driven brushroll according to FIG. 10;

FIG. 12 is a sectional view at the center of the internally driven brushroll according to FIG. 11;

DETAILED DESCRIPTION OF THE PREFERRED EMBODIMENTS

Figure 1:
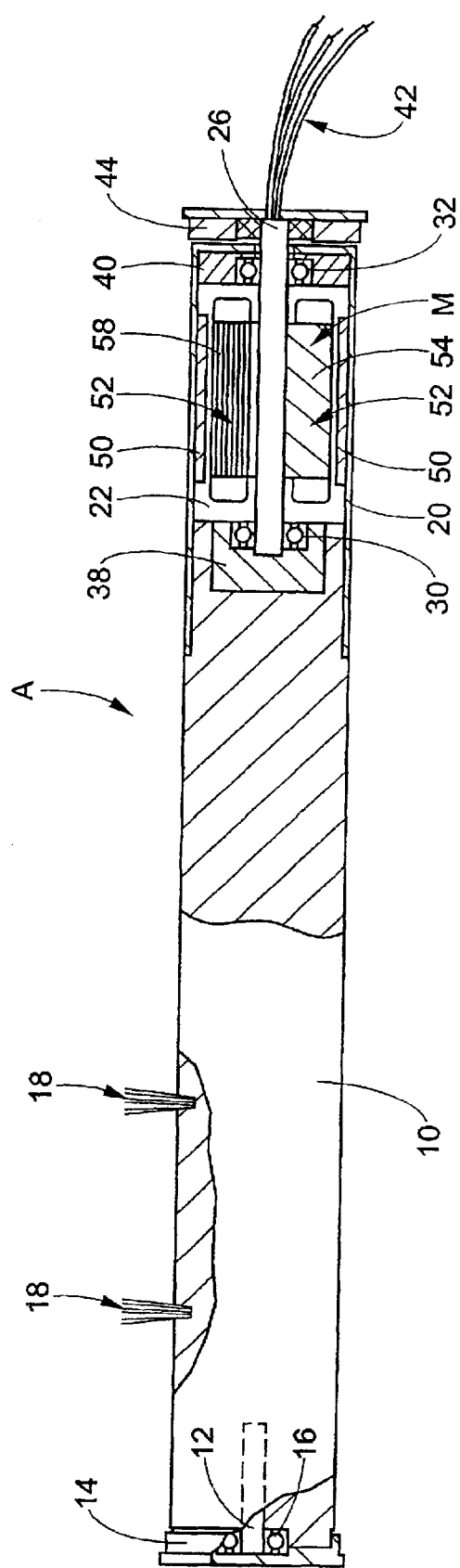
FIG. 1 is a front elevational view of the brushroll according to an embodiment of the present invention, shown in partial cross section.

With reference to FIG. 1, an internally driven brushroll A according to the present invention includes a dowel section 10 which optimally is formed from a continuous, solid piece of rigid material such as wood, hard plastic, or the like. Embedded in one end of the dowel 10 is a shaft 12 fixed within a closely shaped recess formed in the dowel. The shaft 12 is supported in an end cap 14, by a bearing assembly 16. This arrangement permits the shaft 12 and dowel 10 to rotate within the bearing 16 while the end cap 14 remains stationary. Attached to the dowel 10 is at least one agitating element 18, illustrated as a tuft of brush material.

At an opposite end, a rigid cylindrical housing 20 is partially pressed and fixed over a portion of the dowel 10. The housing 20 comprises a magnetic steel tube having an outside diameter matching the outside diameter of the dowel 10. The housing 20 defines an interior volume or cavity 22 sized to accommodate a motor M.

In the illustrated embodiment, the motor M is a brushless type motor with a stationary armature and a rotating magnet. The stationary armature is supported in volume 22 by a stationary shaft 26. Bearing assemblies 30, 32 support stationary shaft 26 on opposing ends, permitting rotational movement of the dowel 10 and housing 20 around stationary shaft 26. In the illustrated embodiment, bearing 30 is snugly fit into a bearing insert 38 which is fixed to, and rotates with, dowel 10. Similarly, bearing 32 is positioned in insert 40 which is fixed to housing 20. Electrical leads 42 connect with the motor M through a channel (not illustrated) in shaft 26. The leads extend out through a second end cap 44.

Motor M, as illustrated, includes a cylindrical permanent magnet sleeve 50 fixed in place on the interior wall of magnetic steel housing 20. The magnet sleeve, which serves as the rotor of the electric motor M, can be an extruded magnet made from what to is referred to in the industry as "bonded" magnet material. Typically, the magnet is extruded in long pieces and cut to length. Such magnets may be magnetized either before or after assembly into the housing 20. These types of tubular magnets 50 can be magnetized with various numbers of discrete poles. Alternately, if the magnet sleeve 50 is a molded sintered magnet, then the magnet is not extruded but molded and ground to size after sintering and then magnetized. In yet another alternative, individual magnets can be spaced around the inside periphery of the housing 20 with alternating north, south polarity. The basic magnetic materials are ferrite magnets both bonded and sintered, and bonded neodymium magnets, however any conceivable magnetic material could be used without loss of functionality.

One means for preventing the metal tube 20 from spinning on the dowel 10 would be to provide tabs (not illustrated) locking the tube to the dowel.

Figure 2:
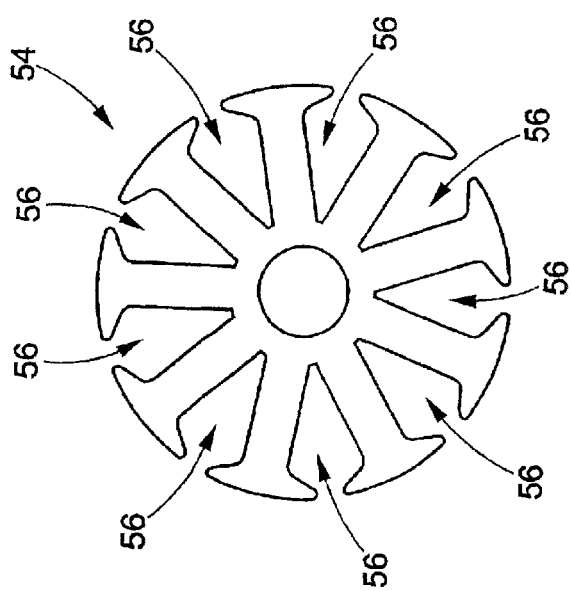
FIG. 2 is an enlarged end elevational view of an exemplary armature core of the motor of FIG. 1.

With continued reference to FIG. 2, motor M also includes a stator assembly 52. The stator assembly includes an armature 54 which can be manufactured from a stack of armature laminations or as a single piece of advanced particulate material. Regardless of the core selected, a number of wire slots 56 consistent with the number of magnetic poles on sleeve 50 and torque requirements of the motor are incorporated. In general, the number of slots 56 is in the range of about 6–20. The slots 56, positioned on the outside periphery of the core, permit armature windings 58 (FIG. 1) to be inserted into the armature. The armature windings 58 comprise a three-phase winding in either a wye connection or a delta connection. The winding is fed a phase-sequenced current from a properly commuted power source and a controller (more fully discussed below).

The motor magnet, in general, will be multi-pole and usually will have on the order of 6–20 magnetized poles. Although the design could use individual magnets spaced around the inside periphery of the magnet yoke or housing 20 (which is a high permeability magnetic steel tube) with alternating north/south polarity, the current design employs a tubular magnet construction made by the extrusion process or the molding process so that the entire magnet is a one piece component that fits snugly into the inside diameter of the housing 20 so that the magnet flux can be efficiently transferred to the housing or magnet yoke and back again without requiring high magnet NMF. If the magnet tube is individual magnets, they would be cemented into place with fixturing directly to the housing or magnet yoke. However the more probable design would employ a single piece magnet sleeve cemented into place in the housing 20.

The motor armature is made from a stack of armature laminations in most cases. However it would be possible to utilize new advanced particulate materials that demonstrate low eddy current loss. If the armature core is made of the new advanced particulate materials, the armature can be one piece with no requirement for individual laminations. However at the moment low cost laminations are still the most practical approach. These laminations or the one piece core would have a given number of wire slots incorporated into them consistent with the number of magnet poles in the magnet and consistent with the torque requirement and manufacturing considerations. In general, the number of slots that would probably be used would be in the range of 6–20. The slots would be positioned on the outside periphery of the lamination and after insulating the slots, the armature winding would be inserted from the outer diameter.

There are no limits in terms of the driving voltage necessary for driving the motor of the present invention. Thus, the voltage could be 9 or 24 volt DC, 110 volt AC, or 220 volt AC. In addition, the placement of the motor can be varied. While in the embodiments illustrated the motor is placed on the right hand end of the dowel, the placement could be anywhere in the dowel. For that matter a smaller motor could be placed at each end of the dowel if so desired. The motor may be placed in the middle of the dowel if the shaft bearing arrangement provides definite armature support that will maintain a uniform air gap between the armature 54 and the sleeve 50. The length of the motor is in direct ratio to the torque of the motor (assuming the same diameter). Thus, a longer motor would be employed if more torque was desired and a shorter motor could be used if less torque were desired. For example, in the motor design illustrated in FIGS. 1 and 6, approximately 40-ounce inches of torque would be developed. It has been determined that a smaller diameter, longer motor is advantageous from the standpoint of providing more surface area through which to dissipate heat losses inside the motor. In that connection, the metal shell is useful for heat dissipation. It should also be recognized that there is a required minimum thickness of the metal sleeve to carry the necessary flux. It would be disadvantageous to have a shell thin enough that the shell would not carry all of the magnetic flux. With that type of design, the shell or housing 20 would also pick up magnetized or magnetizable metal objects such as paper clips or the like on the subjacent surface being cleaned.

One supplier for the magnet sleeve is Seiko-Epson Company of Japan. The material is sold by Seiko-Epson under the code name NEODEX-10. The stator assembly can be made from laminations or can be a solid pressed metal part made from coated particulates.

The use of the magnetic material discussed above allows a rather high power density for a reasonable cost. It is made from a rare earth magnet.

Figure 3:
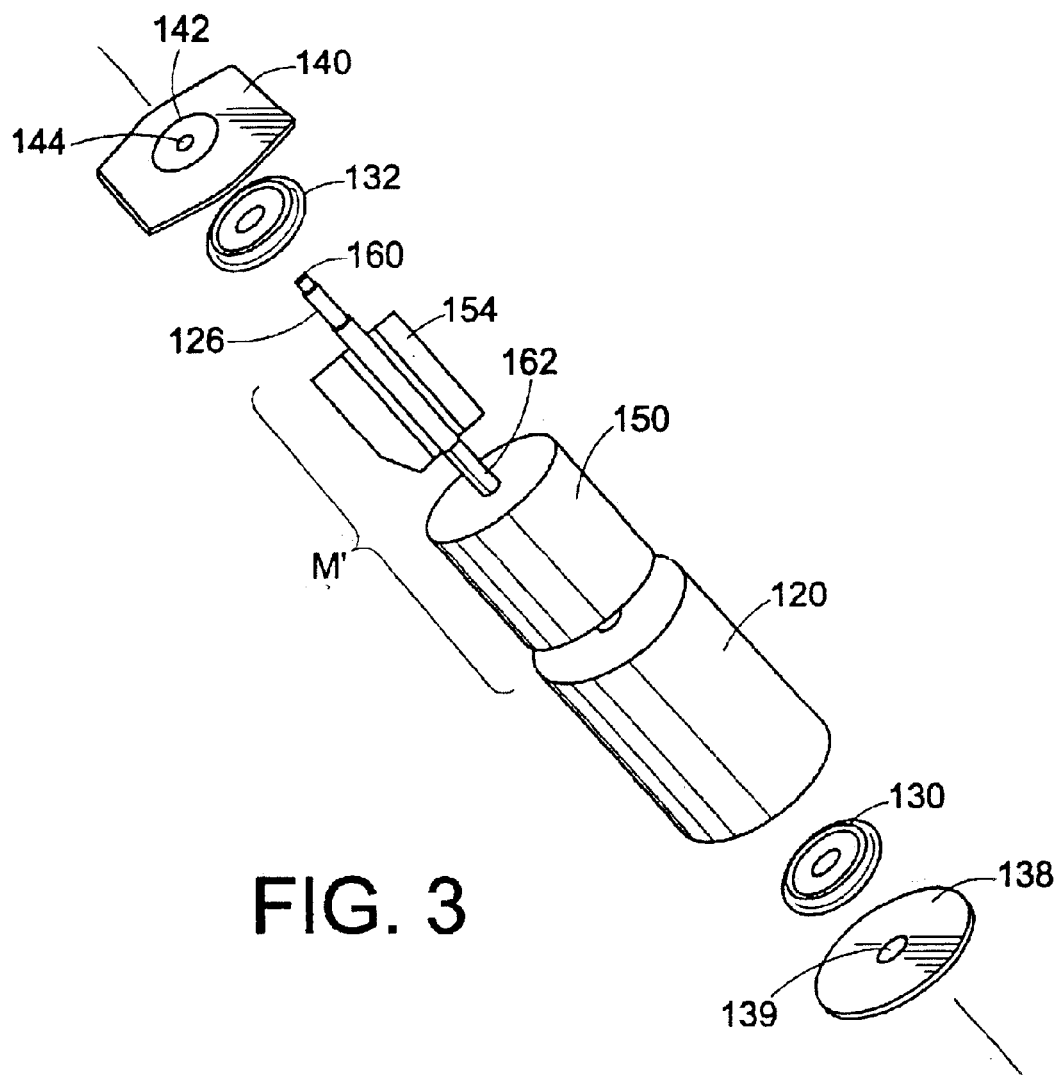
FIG. 3 is an exploded perspective view of another motor assembly which suitably practices the present invention.

With reference now to FIG. 3, another embodiment of a motor M according to the present invention includes a stationary shaft 126 illustrated with a square tip or end 160. The square end 160 is received in a plastic insert cap 140. The cap can be fitted with a complementary shaped insert 142 having a suitably shaped aperture 144 that accommodates the tip 160. Also provided is a standard ball bearing 132 through which one end of the shaft 126 passes. Mounted on the shaft is an armature 154. Rotating about the stationary armature 154 is a sleeve 150 which is mounted in a housing 120. Preferably the sleeve is made from a multi-pole bonded NdFeB magnet. The sleeve 120 can be made from a steel material. Located on the other end of the sleeve 120 is a second standard ball bearing 130. Positioned adjacent the second ball bearing 130 is an end cap 138. Another end 162 of the shaft 126 extends through a central opening 139 in the end cap 138.

Those skilled in the art will recognize that the permanent magnet brushless DC motor type illustrated, while the presently preferred embodiment, is not the only type of motor which can provide the functionality disclosed herein. For example, so-called switch reluctance type motors can also be suitably adapted as the motor M. Typically, these motors do not use magnets, only simple windings in the armature and notched rotors with lobes that are sequentially attracted to the next armature lobe or pole when the proper coils are energized. As above, an inside-out version, in which the coils and armature are stationary and the rotor has shallow lobes that rotate with the brushroll, could also achieve the functionality disclosed above.

Additionally, motor M could alternately be configured as an induction motor. Those skilled in the art will appreciate that this type of motor has an armature and winding similar to that discussed above. The rotor, however is different and employs what is commonly referred to as a "squirrel-cage" induction rotor usually with copper or aluminum bars extending from one end of the rotor to the other and shorted out end rings or cast connections. When the stator or armature is excited, induced current flows in the induction rotor causing torque in the motor. Again, an inside-out geometry is used with the squirrel-cage being positioned on the inner diameter of the motor tube and rotating along with the brushroll.

Control schemes for the above-described motors are all somewhat varied, but in general the motors typically use three-phase power or a commuted three-phase power source. Alternately, a stand alone system operating from one phase power sources, such as batteries and the like, can also be employed with suitable electronic controllers designed to provide appropriate power signals, no matter what style of motor is used. Those skilled in the art will appreciate that electronic control circuits are widespread for the various described motors, and are relatively straightforward to implement.

Figure 4:
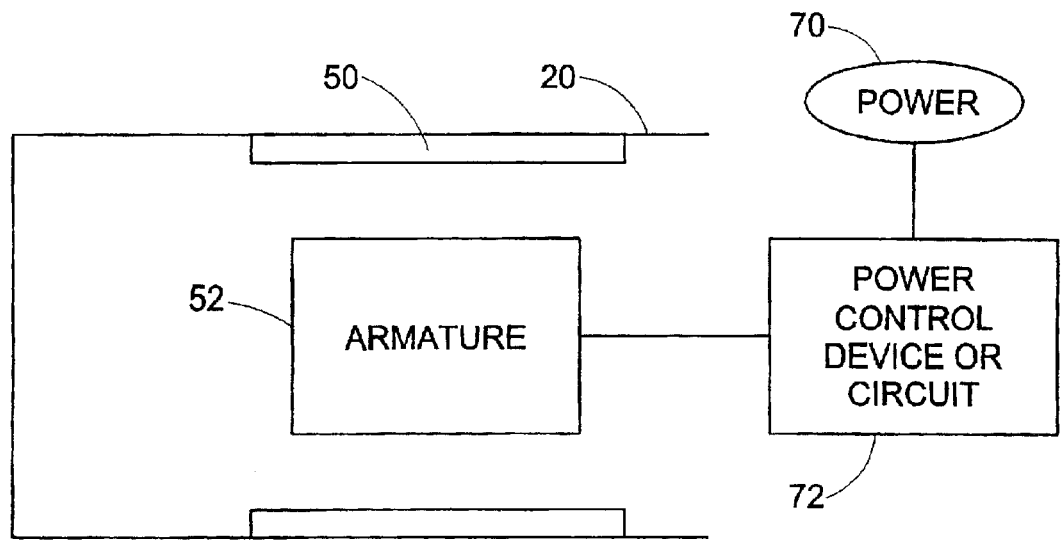
FIG. 4 is a functional block diagram of a speed regulating mechanism suitable to practice the present invention.
Figure 5:
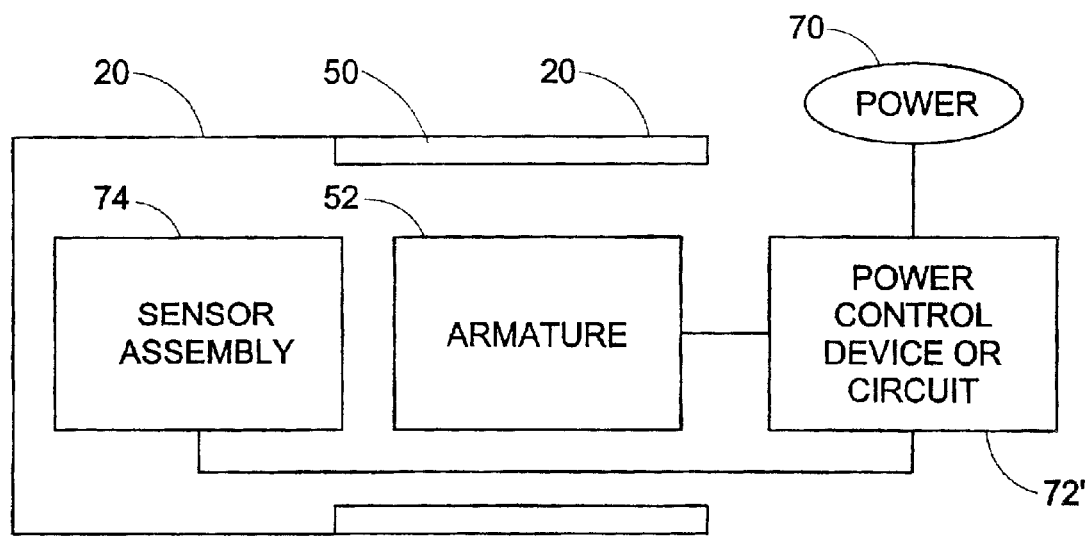
FIG. 5 is a functional block diagram of a speed regulating mechanism suitable to practice an alternate embodiment of the present invention; and, FIG. 6 is a perspective view of an upright vacuum cleaner together with an exploded perspective view of various components of an internally driven agitator employed therein.

With reference now to FIG. 4, electrical signals to the stator assembly 52 can be provided from a power source 70 through a speed adjusting circuit 72. Alternately, with reference to FIG. 5, a sensor assembly 74, can be provided within the volume 22 (FIG. 1), for calculating a position of the housing 20 relative to the stator 52. This position information is forwarded to the speed adjusting circuit 72 which permits selection of the proper commutated signal to be sent along leads 42 to the stator 52. The sensor assembly 74 may include a magnetic field detector which detects the magnetic polarity of a determined portion of the magnet sleeve 50. Alternately, the sensor assembly could include an optical type sensor configured to detect rotations of the housing. While the speed adjusting circuit 72 is illustrated as being located outside of the motor M, the circuitry could alternately be placed with the motor M inside the interior volume 22.

Moreover, the speed adjusting circuit or device 72 incorporates various functional capabilities such as constant brushroll speed maintenance; overload protection stopping brushroll rotation; reverse brushroll operation easing, for example, backward vacuum movement; and variable brushroll rotation depending on floor surface, e.g. no rotation on tile, wood and delicate floor coverings, and fast rotation for heavy duty carpeting or especially dirty environments.

Figure 6:
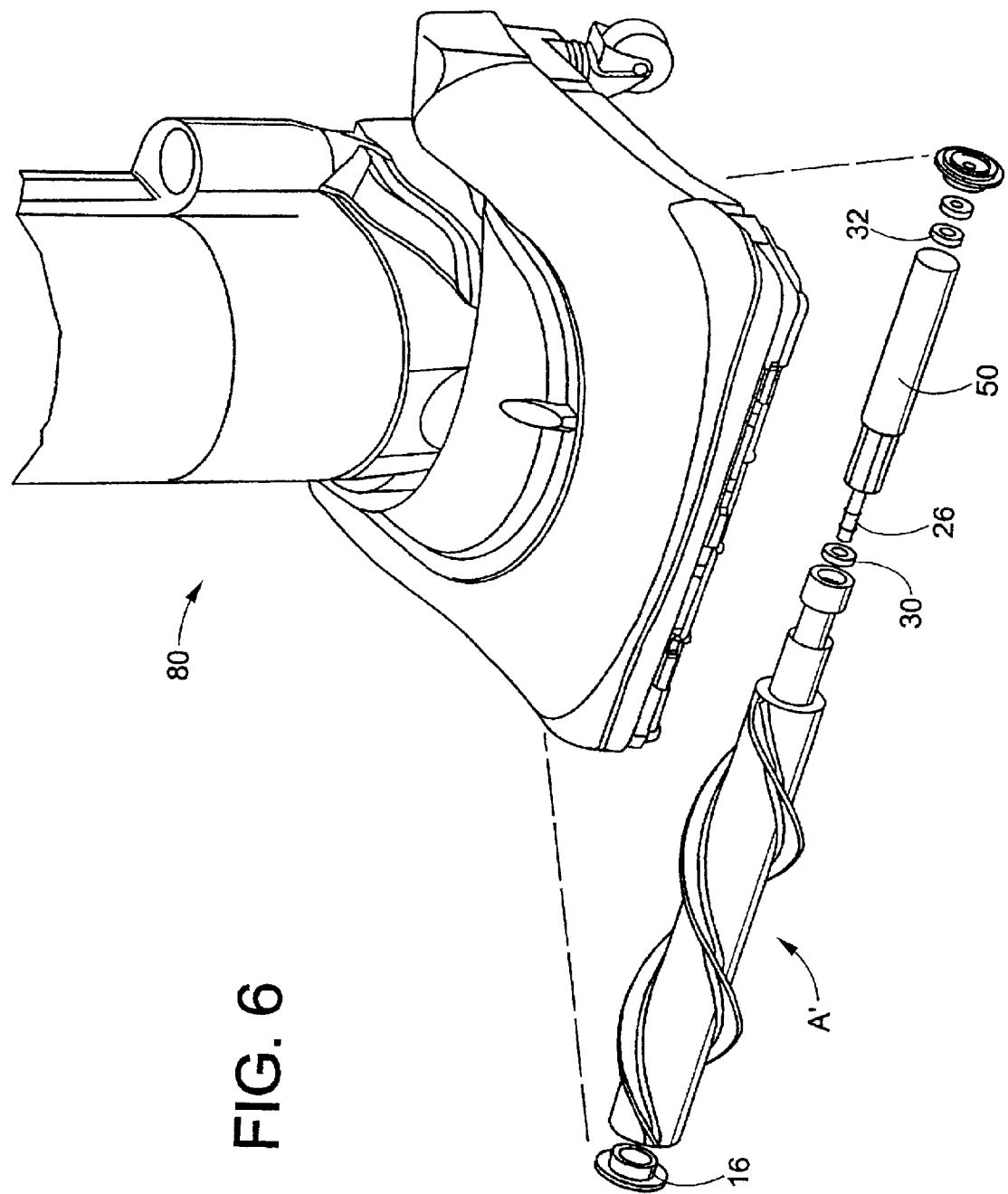

With reference now to FIG. 6, a vacuum cleaner 80 is illustrated with an exploded view of an internally driven agitator A' according to the present invention. The vacuum cleaner is illustrated as being of an upright design. It has a suction nozzle located on the floor. Positioned in the nozzle or adjacent thereto is the agitator according to the present invention. In the current design, the agitator A' rotates on its bearings 16, 30, and 32 while the shaft 26 remains stationary. Thus, the stator assembly 52 remains stationary and the magnet sleeve 50 rotates along with the housing (which is not illustrated in FIG. 6).

This illustration shows that the motor is a separate entity from the roller and is indeed much shorter. This permits the use of short shafts and bearings enabling less expensive and more accurate manufacture of the motor components. Indeed, with shorter shafts, it is much easier to maintain an accurate air gap between the rotor and the stator thus avoiding rubbing and other undesirable operations. Additionally, motors can be assembled in incremental lengths where a magnet of a unit length and an armature stack of unit length comprise the smallest motor. When two magnets and two armatures are joined, a motor of roughly double the power and torque is provided, simplifying the manufacturing process for a variety of applications.

Figure 7:
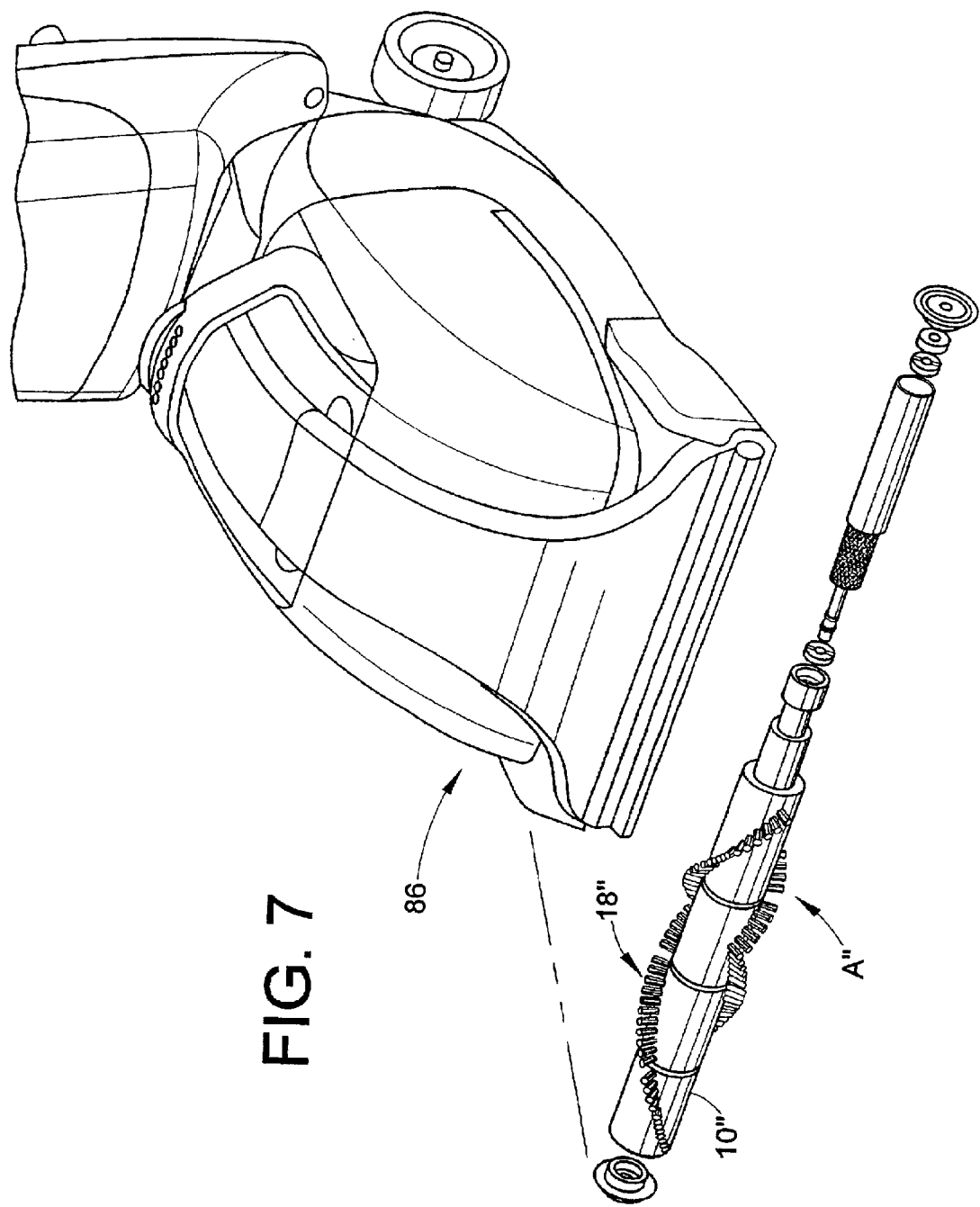
FIG. 7 is a perspective view of a carpet extractor together with an exploded perspective view of an internally driven brushroll employed therein.

With reference now to FIG. 7, an alternate embodiment includes a motorized brushroll A" in a carpet extractor 86. In this embodiment, dowel 10" is configured with agitator elements 18" disposed in a predetermined pattern around the exterior surface of the dowel formed from a plurality of discreet bristle groups.

Figure 8:
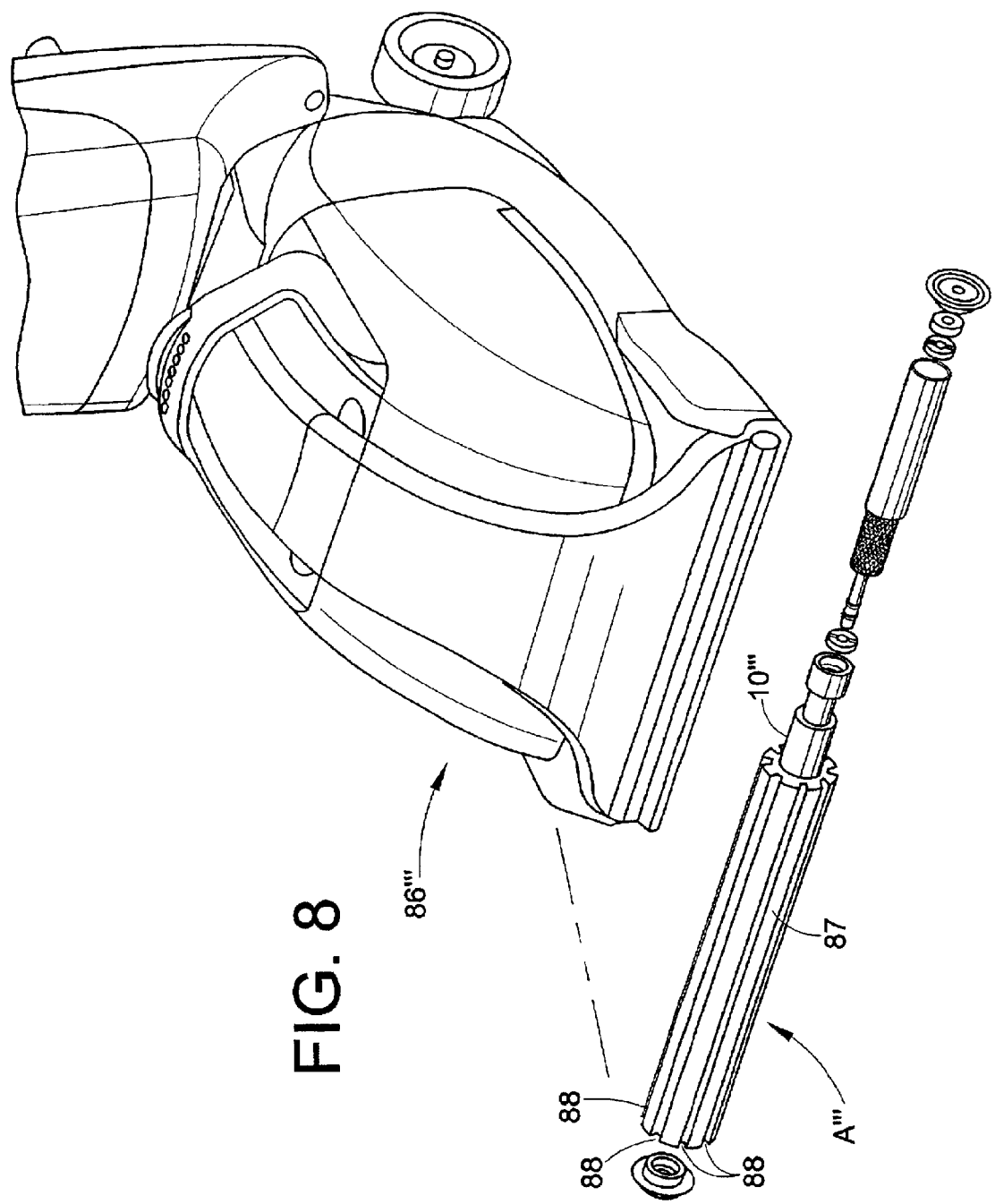
FIG. 8 is a perspective view of a carpet extractor together with an exploded perspective view of an internally driven agitator employed therein.

With reference now to FIG. 8, carpet extractor 86' is configured with an internally driven agitator A'" having grooves 88 disposed along the exterior surface of the dowel 10'" as a sponge-like cleaning element 87. In this embodiment, the grooves 88 are especially suited to assist in the extraction of water or other fluid on the floor surface. This type of motor is instantly reversible which is advantageous in a carpet extractor environment.

Figure 9:
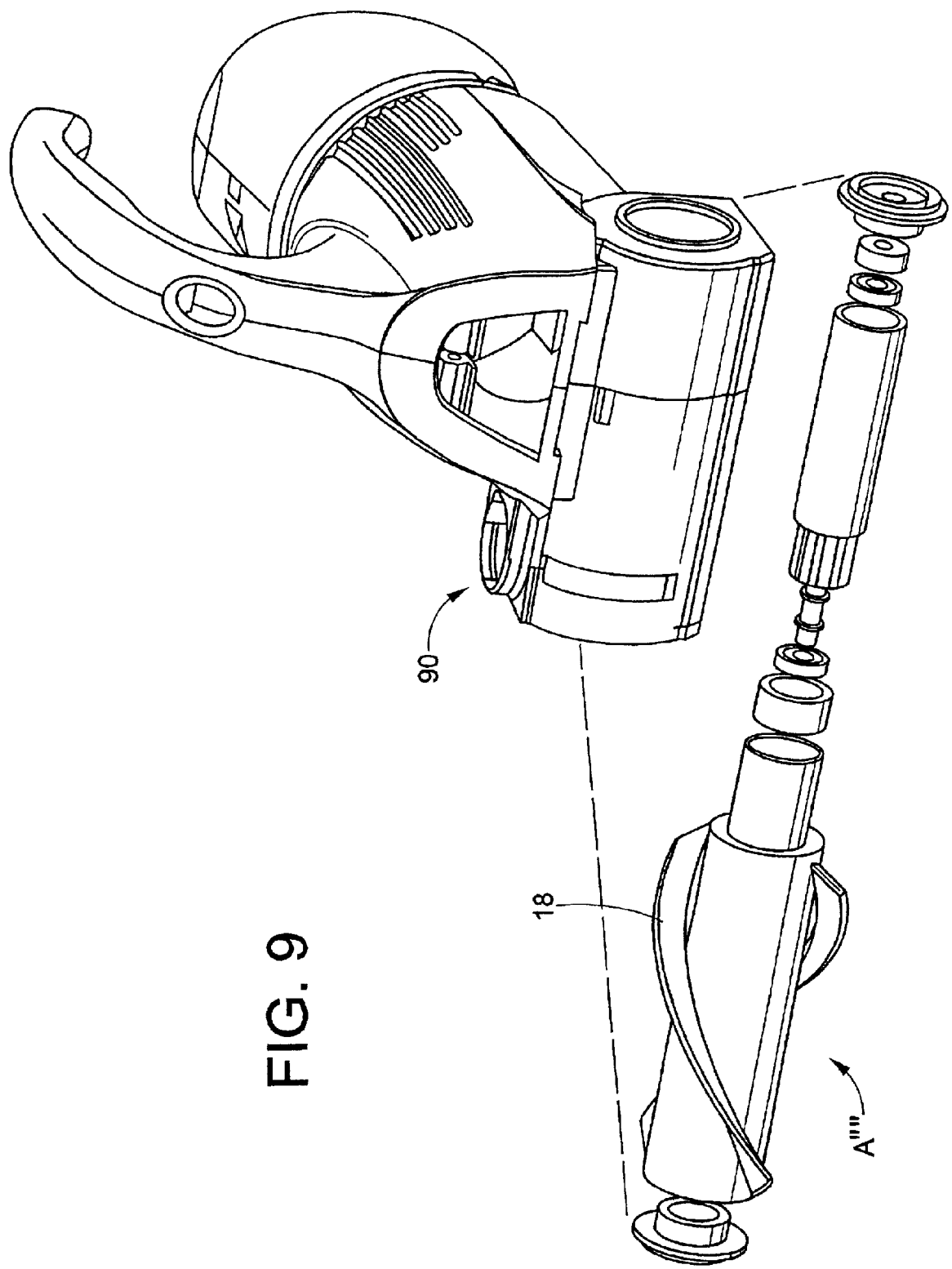
FIG. 9 is a perspective view of a hand held portable vacuum cleaner together with an exploded perspective view of an internally driven agitator adapted for use therein.

With reference now to FIG. 9, a hand-held vacuum cleaner 90 includes the internally driven agitator A"" having a continuous agitating element or fin 92 formed of rubber or the like.

Thus the present invention pertains to an inside out brushless motor having a stationary armature or "stator" and a rotating magnet sleeve or "rotor." This is just the opposite of a traditional electric motor. With the motor of the present invention, one can sense and control the speed of the rotating brushroll of the vacuum cleaner. In addition, this design eliminates the driving belt for the agitator or brushroll since the belt, as discussed above, is prone to failure.

Figure 10:
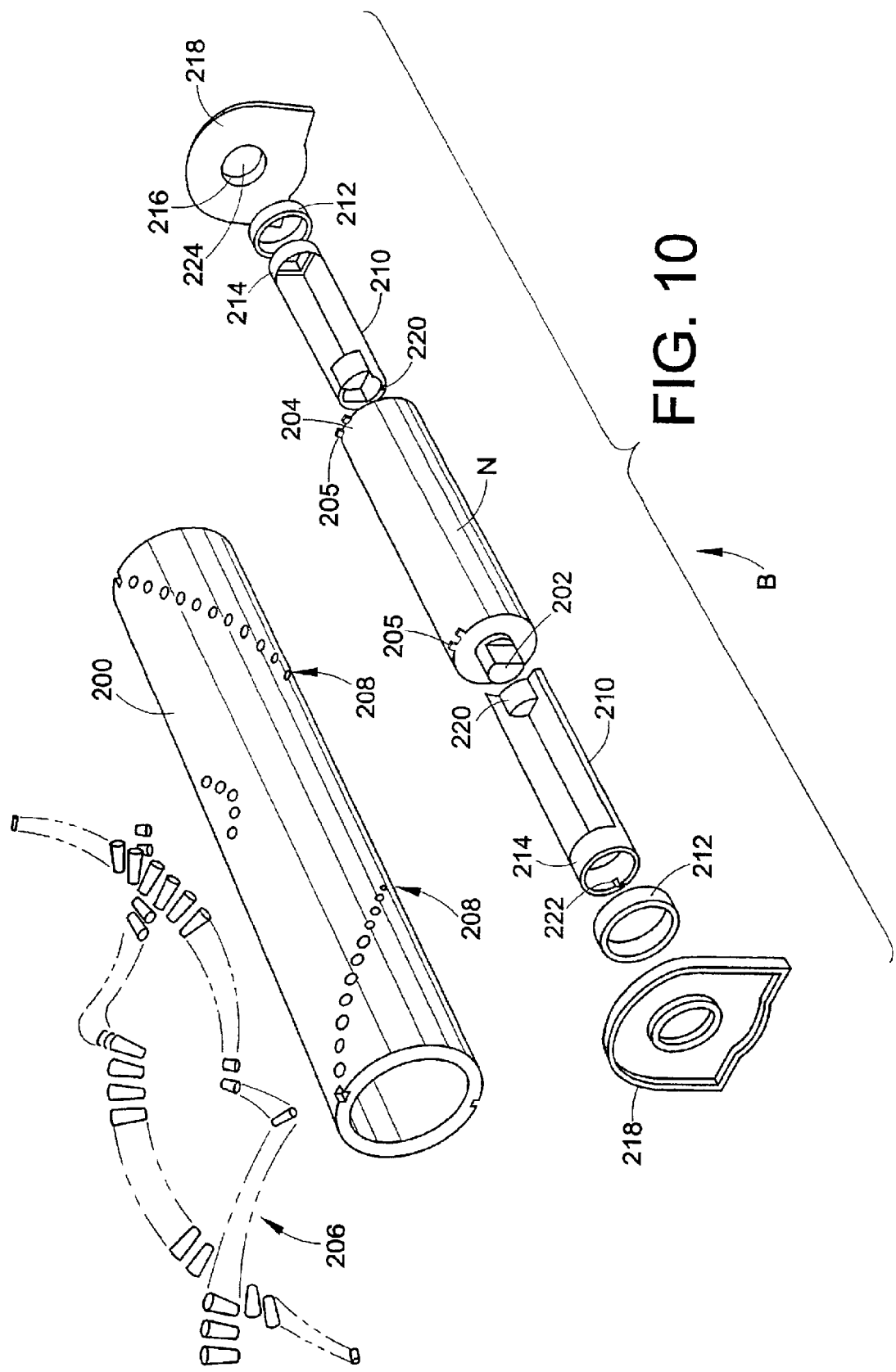
FIG. 10 is an exploded perspective view of an internally driven brushroll according to another embodiment of the present invention.

With reference now to FIG. 10, a brushroll B includes a brushroll tube 200 which rotates while a shaft 202 remains stationary. Thus, the stator assembly (not shown) of a custom motor N (as described above) remains stationary and a magnetic housing 204 rotates, having slotted tabs 205 fixedly mounted to the motor housing at each end, thus rotating with the magnetic housing 204. The brushroll tube 200 can be formed from a continuous piece of extruded rigid material such as aluminum, steel, or the like. Attached to the brushroll tube 200 is at least one agitating element 206, illustrated as bristles suitable for press-fitting into a plurality of holes 208 in the brushroll tube 200. Fitted within the brushroll tube 200 is the motor N, with motor supports 210 and bearing assemblies 212 fitted within each end of the brushroll tube 200. The motor supports 210 have cylindrically shaped outer ends 214 that extend through the bearings 212, partially protruding beyond the ends of the brushroll tube 200, and are fitted into cylindrical recesses 216 in stationary end caps 218 for support. The motor supports 210 have inner ends 220 that are configured to fit over respective ends of the motor shaft 202. As illustrated, each end of the motor shaft 202 is configured with a D shape so that the shaft 202 and the motor supports 210 are keyed together for rotation. Further, each of the motor supports 210 is formed with a slot 222 that fits over a tab 224 on the respective end cap. Since the end caps 218 are mounted in a manner to prevent rotation, the motor supports 210 and the motor shaft 202 are, likewise, prevented from rotating. While each end of the motor shaft 202 are illustrated as having a D shape, other shapes, square for example, can be employed with equal efficacy. Similarly, other suitable structures may be employed to interlock or key the motor shaft 202, motor support 210 and end cap 218 arrangement together so that they remain stationary while the brushroll tube 200 and the housing 204 are free to rotate in unison.

With reference now to FIG. 11, it illustrates how motor N is cooled. Each end cap 218 is formed with an opening 226 permitting air to pass through. One of the openings 226 serves as an air intake while the opening of the remaining end cap 218 serves as an air outlet. Air flows in one of the openings 226, past the respective motor support 210, through a gap between the motor N and the brushroll tube 200 (as shown in FIG. 12), past the remaining motor support 210 and out of the remaining opening 226. The gap between the stator and the magnet sleeve is not shown in this embodiment.

Figures 13, 14:
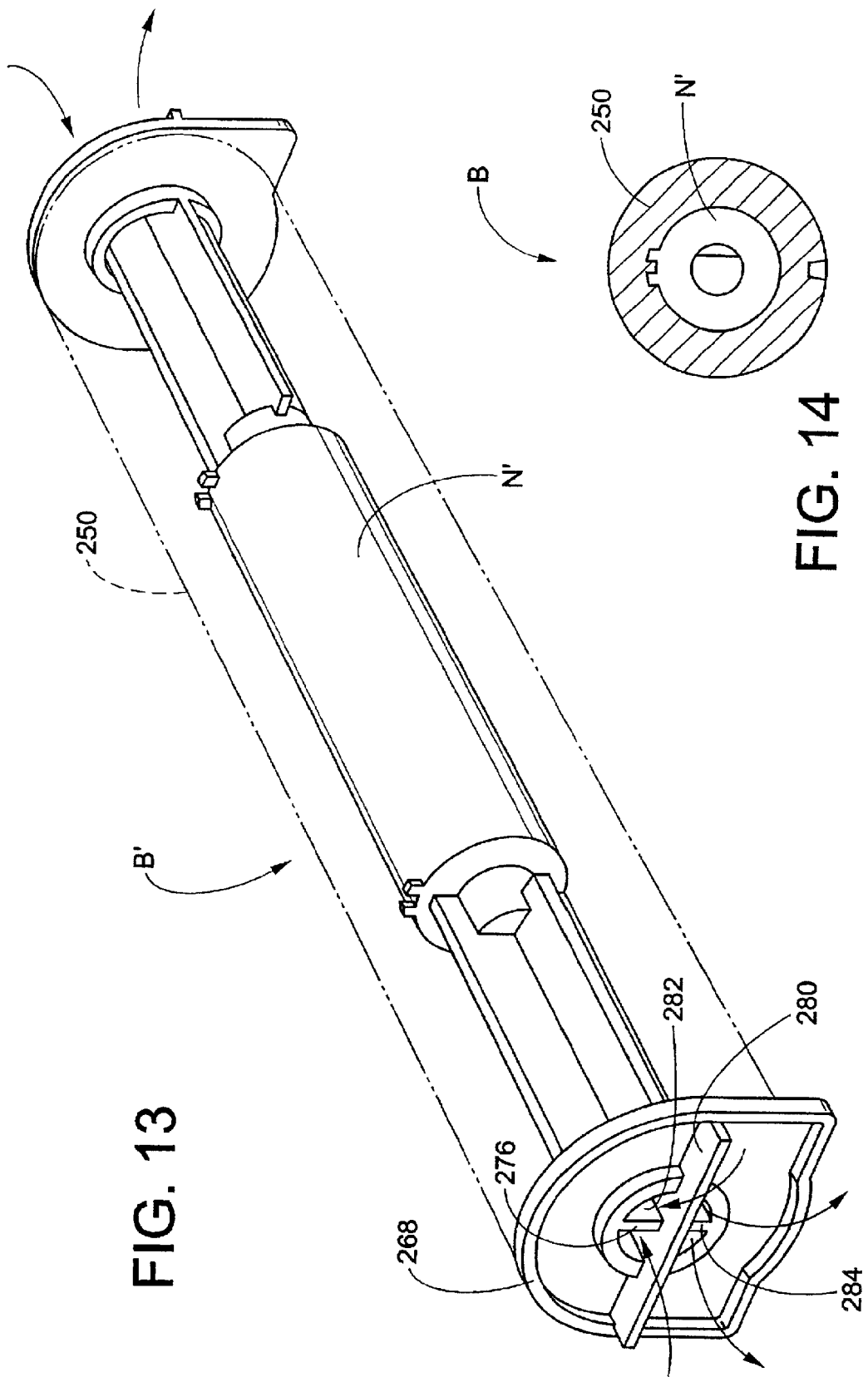
FIG. 13 is a see through perspective view of another internally driven brushroll according to still another embodiment of the present invention.
FIG. 14 is a cross sectional view at the center of the internally driven brushroll according to FIG. 13.

FIG. 13 illustrates another brushroll B' having a motor N'. In this embodiment, four openings 276 are provided in each end cap 268. These are partitioned by a heat sink 280 into an intake half 282 and an exhaust half 284. In this embodiment, no gap exists between the motor N' and a brushroll tube 250. Air thus enters the intake 282, passing over the heat sink 280 to a respective end of the motor N', thus cooling the respective end of the motor N', and exits through the respective exhaust 284, passing under heat sink 280, thus transferring heat from the motor N' and the heat sinks 280 to the environment. FIG. 14 illustrates a section at the center of brushroll B', showing that no gap exists between the brushroll tube 250 and the motor N'. The gap between the stator and the magnet sleeve is not shown in this embodiment.

Figure 15:
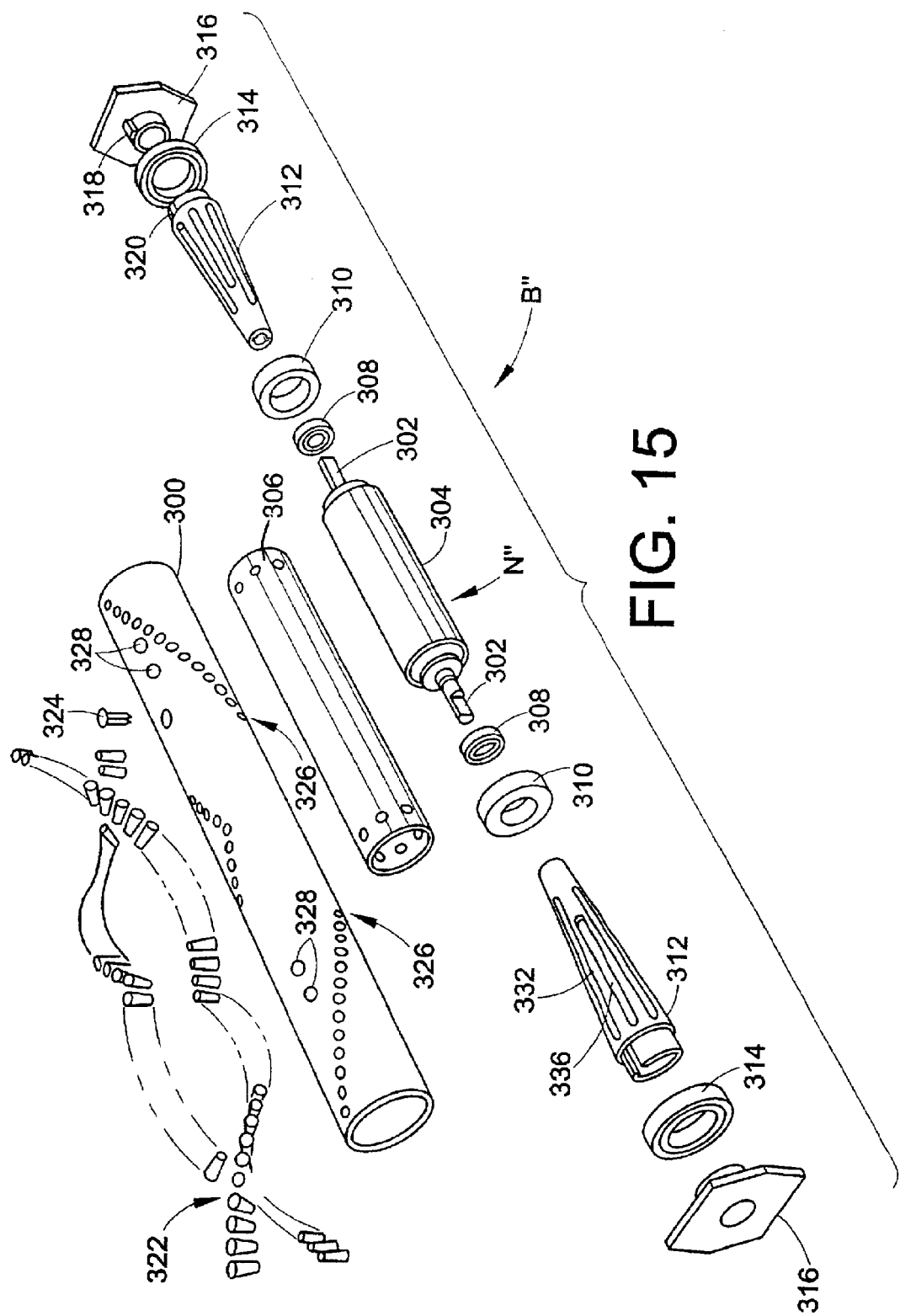
FIG. 15 is an exploded perspective view of an internally driven brushroll according to yet another embodiment of the present invention.

With reference now to FIG. 15, another motorized brushroll B" is illustrated according to the present invention. As with the previously described brushroll B', a brushroll tube 300 rotates while a shaft 302 remains stationary. Brushroll B" includes a motor N", preferably employing a single piece magnet sleeve 304, cemented, or fixed by other means, into place in a housing 306, similar in concept to the magnet sleeve 50 and magnetic steel housing 20 of the embodiment described with respect to FIG. 1. Also included in the brushroll B" are two motor bearings 308, respective bearing insulators 310, support cones 312, brush bearings 314 and end caps 316.

Figure 16:
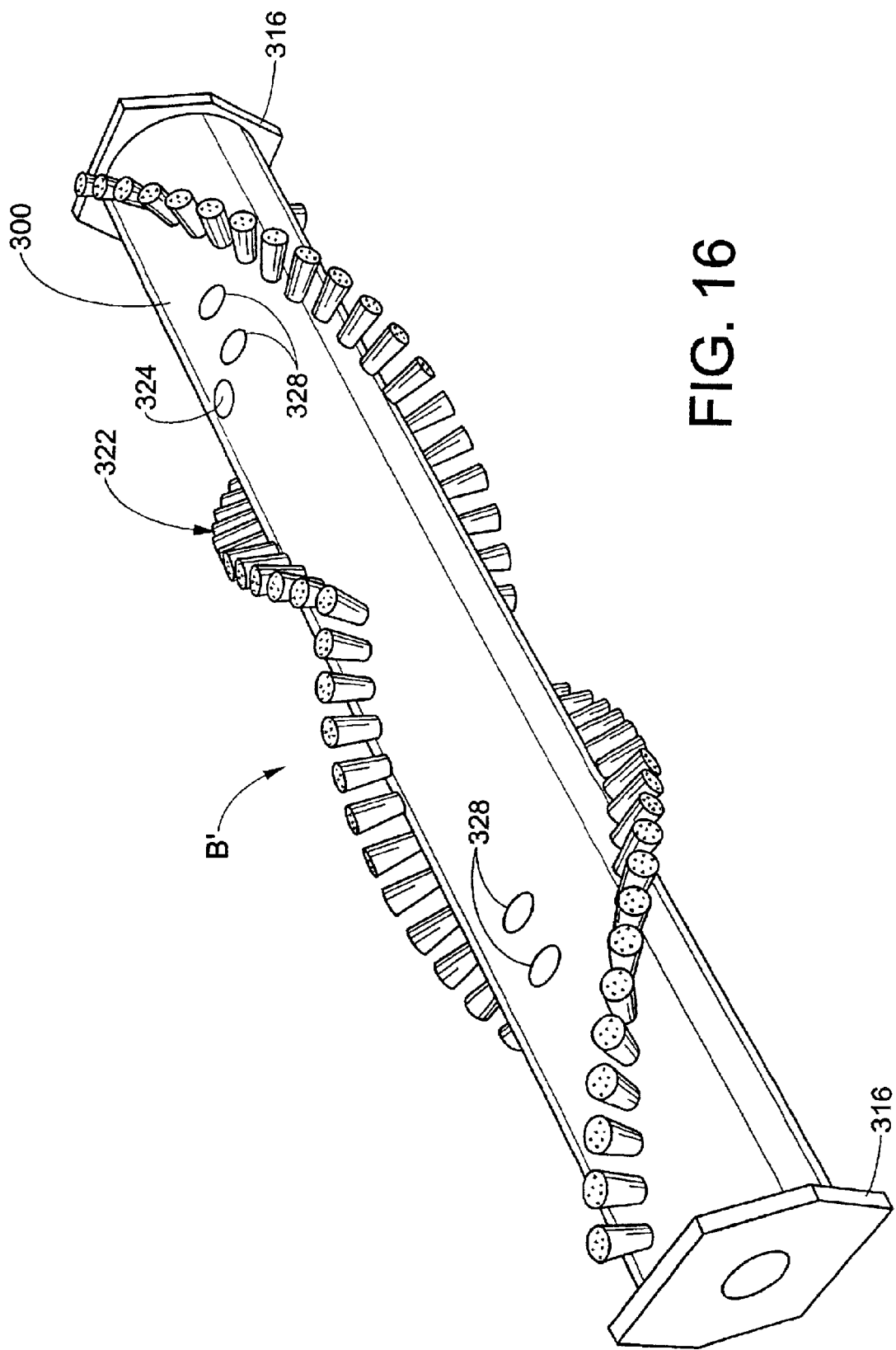
FIG. 16 is a perspective view of the internally driven brushroll according to FIG. 15.

The support cones 312 are supported at their outer ends by the respective end caps 316 and are each prevented from rotating by a tab 318 on the adjacent end cap 316 that interlocks with a slot 320 on the support cones 312. Also shown are agitating elements 322 in the form of bristles (see FIG. 16) and a drive fastener 324 for fixing the housing 306 inside the brushroll tube 300. The brushroll tube 300 has a plurality of mounting holes 326 suitable for press-fitting of agitating elements 322. The tube 300 accommodates the end caps 316 and the drive fastener 324. Cooling holes 328 are provided in the brushroll tube 300 and are described in further detail below. Each support cone 312 includes a plurality of ribs 332 separated by slots 336.

Figure 17:
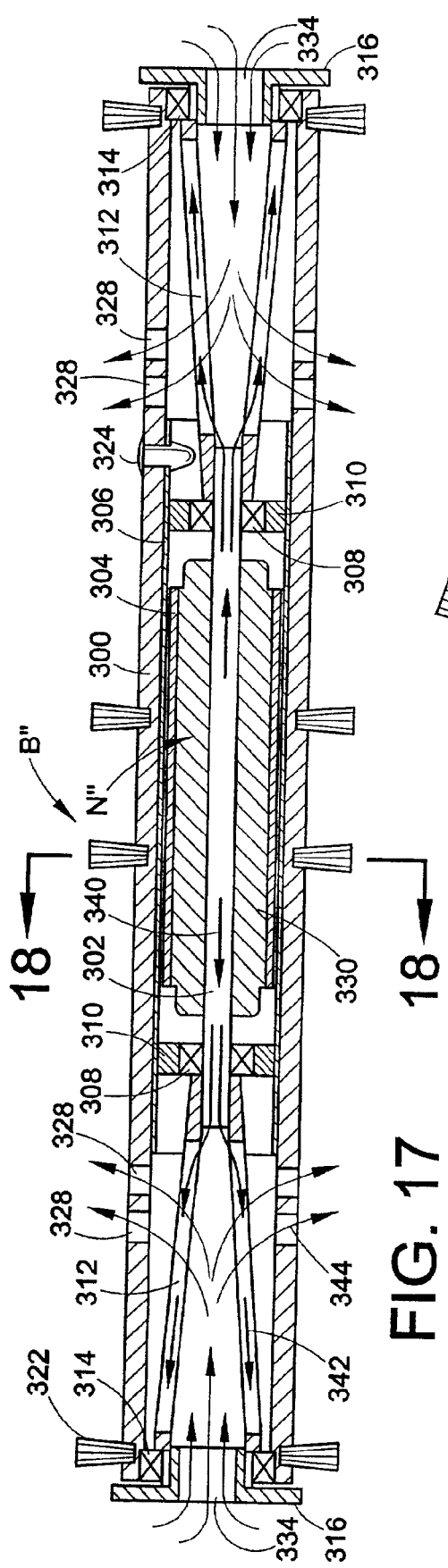
FIG. 17 is a cross sectional view of the internally driven brushroll according to FIG. 15.

With reference now to FIG. 17, the motor shaft 302 is fixedly mounted, rotation wise, into the inner ends of the support cones 312 so that a stator assembly 330 of the motor N" remains stationary while the magnet sleeve 304 and the housing 306 rotate with the brushroll tube 300. The motor shaft 302 is supported at its ends by respective bearings 308 which are in turn supported by bearing insulators 310 supported by the housing 306. The drive fastener 324 is shown locking the housing 306 to the brushroll tube 300.

Also illustrated in FIG. 17 is a means of removing heat from the motor N". Heat generated by the motor travels by conduction, shown by arrows 340, and travels along the motor shaft 302 towards the ends of the shaft. From the ends of the motor shaft, heat is transferred by conduction to the support cones 312 and is conducted along the ribs 332 forming the center portion of the support cones, as shown by arrows 342. Air enters the brushroll tube 300 through openings 334 in the end caps 316 and flows, as shown by arrows 344, through ventilation openings or slots 336, between the support cone ribs 332, thus removing heat from the support cones and carrying it away through cooling holes 328 in the brushroll tube 300. Air flow may be facilitated by the vacuum present in the vicinity of the cooling holes 328.

Figure 18:
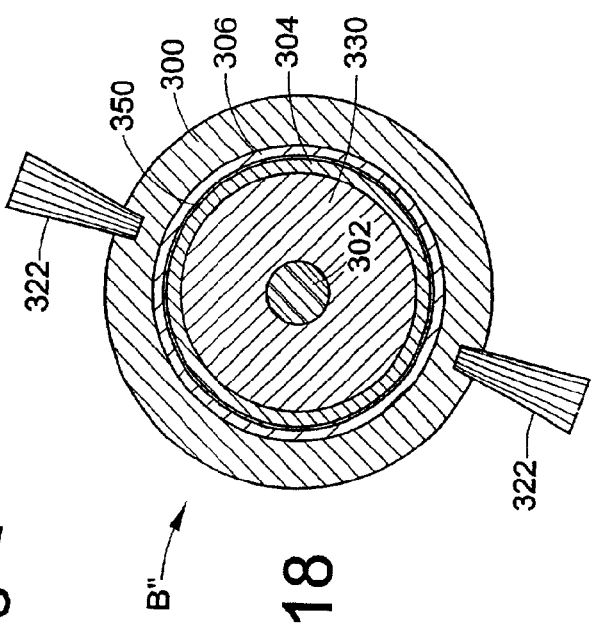
FIG. 18 is a cross sectional view at the center of the internally driven brushroll according to FIG. 15.

FIG. 18 illustrates the motor shaft 302, the stator 330, the magnet sleeve 304, the magnetic steel housing 306, the brushroll tube 300 and the agitator elements 322. A small gap 350, as previously described, is maintained between the stator 330 and the magnet sleeve 304 to allow relative rotation therebetween.

Exemplary dimensions for the embodiment of FIG. 17 are as follows:

Magnetic steel housing 306 OD . . . 1.125"
Magnetic steel housing 306 ID . . . >1.055"
Magnet sleeve 304 OD . . . <1.055"
Magnet sleeve 304 ID . . . 0.90"
Stator assembly 330 stack length . . . 3.50"
Number of magnet sleeve 304 poles . . . 8
Number of stator assembly 330 wire slots . . . 6

The invention has been described with reference to the preferred embodiments. Modifications and alterations will occur to others upon a reading and understanding of the preceding detailed description. It is intended that the invention be construed as including all such modifications and alterations insofar as they come within the scope of the appended claims or the equivalents thereof.

Having described the preferred embodiments, we now claim:

1. In combination, a brushroll and motor assembly for a cleaning device, comprising:
    a dowel having first and second ends and a longitudinal axis;
    a housing to which the dowel is rotatably mounted;
    at least one cleaning element protruding from the dowel;
    a first shaft connected to the dowel and extending along the longitudinal axis;
    a magnet frame housing secured to the dowel and encircling at least a portion of the first shaft, the housing defining an interior volume;
    a motor assembly supported within the interior volume and encircling at least a portion of the first shaft;
    a controller which selectively powers the motor assembly inducing rotational movement in the housing and the dowel; and
    a sensor in communication with the controller which senses rotational speed of the housing and the dowel wherein the controller adjusts power to the motor assembly based on the sensed rotational speed.

2. The combination as set forth in claim 1, further comprising;
    a second shaft extending along the longitudinal axis wherein the first shaft is located at said first end of the dowel and said second shaft is located at the second end of the dowel, said second shaft being spaced from said first shaft and being coaxial therewith.

3. The combination as set forth in claim 2, further comprising:
    a bearing assembly disposed around a portion of the second shaft permitting relative rotational motion.

4. The beltless brushroll as set forth in claim 1, where the motor assembly comprises:
    a magnetized rotor frame positioned adjacent or internal to an interior surface of the housing; and
    a brushless electromagnetic stator supported by the first shaft within the volume.

5. A vacuum cleaner comprising:
    a nozzle; and,
    an agitator positioned adjacent the nozzle, the agitator comprising:
        a tube, defining an interior volume, having first and second ends and a longitudinal rotation axis;
        a shaft positioned in the tube and extending along the longitudinal axis;
        a rotor assembly fixedly mounted to an internal surface of the tube;
        a magnetic assembly supported within the interior volume by the shaft, the magnetic assembly selectively magnetically interacting with the rotor assembly to induce rotation of the tube; and
        support cones mounted on the first and second ends of the shaft, said support cones having ventilation openings formed in a wall thereof.

6. The vacuum apparatus as set forth in claim 5, wherein the agitator further comprises stationary end caps located adjacent to the first and second ends of the tube, supporting respective ends of the support cones, and wherein the tube includes cooling holes wherein air enters through an opening in each of the end caps, flows through the ventilation openings of the respective support cone and exits though the respective cooling holes of the tube.

7. The vacuum apparatus as set forth in claim 5, where the magnetic assembly comprises a brushless motor assembly.

8. The vacuum apparatus as set forth in claim 5, further comprising a controller which selectively powers the magnetic assembly.

9. The vacuum apparatus as set forth in claim 8, further comprising a sensor which provides data indicative of rotational speed of the agitator to the controller.

10. A vacuum cleaner comprising:
    a housing adapted for movement on a subjacent surface;
    a nozzle defined in said housing, said nozzle having an opening;
    a brushroll rotatably mounted to said housing adjacent said nozzle opening, said brushroll comprising:
        a tube having first and second ends and a longitudinal axis;
        an interior volume defined in said tube;
        a magnet rotatably mounted in said interior volume; and
        an armature rigidly mounted in said interior volume and spaced from said magnet;
    a controller which varies power applied to the armature controlling speed and rotational direction of the brushroll; and
    a sensor which senses rotational speed and direction of the brushroll, the sensor in data communication with the controller.

11. The vacuum cleaner as set forth in claim 10, where the magnet further comprises a plurality of alternating north and south poles, the magnet and the armature forming a brushless three phase motor.

12. The vacuum cleaner as set forth in claim 10, where the brushroll further comprises a first shaft disposed within the interior volume, mounted to a support cone assembly enabling the shaft to remain stationary and rotatably support the tube via a bearing.

13. A vacuum cleaner comprising:
    a housing adapted for movement on a subjacent surface;
    a nozzle defined in said housing, said nozzle having an opening;
    a tube having first and second ends and a longitudinal axis, said tube being rotatably mounted to said housing adjacent said nozzle opening;
    at least one agitating element protruding from said tube;
    a shaft located in an interior volume of the tube and extending along the longitudinal axis thereof;
    a stator rigidly mounted on said shaft;
    a magnet yoke surrounding said shaft and said stator and spaced therefrom, said magnet yoke being rigidly connected to said tube; and a permanent magnet rotor fixedly mounted to an interior surface of said magnet yoke, said permanent magnet rotor overlying and being coaxial with said stator and spaced therefrom said rotor and stator forming a motor for rotating said tube wherein said rotor is driven by changes in induced magnetic fields in the stator.

14. The vacuum cleaner of claim 13 further comprising a variable frequency controller in power supply in connection with the windings of the stator for controlling a rotational speed of the rotor.

15. The vacuum cleaner of claim 13 wherein the rotor permanent magnet is of the ferrite type.

16. The vacuum cleaner of claim 13 further comprising a controller which varies power applied to the windings of the stator for controlling speed and rotational direction of the tube.

17. A method of rotating a surface working apparatus in a vacuum cleaner comprising:

applying an electrical signal to a motor disposed within the surface working apparatus;

responsive to the applied electrical signal, generating an electromagnetic field which interacts with a permanent-magnetic field associated with an interior wall of the surface working apparatus, inducing rotation of the surface working apparatus;

computing rotational information of the surface working apparatus; and altering the applied electrical signal to the motor based on the computed rotational information.

18. The method of rotating a surface working apparatus as set forth in claim 17, wherein the step of applying an electrical signal comprises the subsidiary step of:

applying a three phase-offset current to selected windings in a stationary armature.

19. The method of rotating a surface working apparatus as set forth claim 17, wherein the step of generating an electromagnetic field comprises the subsidiary steps of:

rotating the surface working apparatus and a shaft rigidly connected to the surface working apparatus at a first end about a longitudinal axis; and rotating the surface working apparatus about a stationary shaft on the longitudinal axis at a second end of the surface working apparatus.

* * * * *